(12) United States Patent
Hua (10) Patent No.: US 12,008,271 B1
(45) Date of Patent: Jun. 11, 2024

(54) ADAPTIVE RAID WIDTH AND DISTRIBUTION FOR FLEXIBLE STORAGE

(71) Applicant: Dell Products L.P., Hopkinton, MA (US)

(72) Inventor: Kuolin Hua, Natick, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/302,837

(22) Filed: Apr. 19, 2023

(51) Int. Cl.
*G06F 3/06* (2006.01)

(52) U.S. Cl.
CPC .......... *G06F 3/067* (2013.01); *G06F 3/0619* (2013.01); *G06F 3/0631* (2013.01)

(58) Field of Classification Search
CPC ....... G06F 3/067; G06F 3/0619; G06F 3/0631
USPC ........................................................ 711/114
See application file for complete search history.

(56) References Cited

U.S. PATENT DOCUMENTS

| 2002/0078276 | A1* | 6/2002 | Hung | G06F 3/0658 |
| | | | | 714/E11.034 |
| 2005/0063217 | A1* | 3/2005 | Shiraishi | G06F 11/1096 |
| | | | | 714/E11.034 |
| 2008/0276057 | A1* | 11/2008 | Hetzler | G06F 3/0605 |
| | | | | 711/159 |
| 2020/0401340 | A1* | 12/2020 | Johri | G06F 3/0659 |
| 2022/0391359 | A1* | 12/2022 | Dronamraju | G06F 16/182 |

* cited by examiner

*Primary Examiner* — Than Nguyen
(74) *Attorney, Agent, or Firm* — Anderson Gorecki LLP (57) ABSTRACT

A software-defined, server-based storage system is configured to support single node granular scaling and adaptive RAID width capabilities. The storage system includes multiple homogeneous storage nodes, each including a server and local storage. Aggregate storage is organized into same-size cells. RAID group members are distributed in cells across storage nodes in a recursive fractal pattern. The storage system is scaled by metamorphosing between recursive fractal distribution of the RAID groups and linear distribution of the RAID groups and splitting matrices of cells. When a sufficient number of new storage nodes have been added, new larger width RAID groups will be formed.

20 Claims, 9 Drawing Sheets

| 0 | 1 |
|---|---|
| 1 | 0 |

4x4

| 0 | 1 | 2 | 3 |
|---|---|---|---|
| 1 | 0 | 3 | 2 |
| 2 | 3 | 0 | 1 |
| 3 | 2 | 1 | 0 |

8x8

| 0 | 1 | 2 | 3 | 4 | 5 | 6 | 7 |
|---|---|---|---|---|---|---|---|
| 1 | 0 | 3 | 2 | 5 | 4 | 7 | 6 |
| 2 | 3 | 0 | 1 | 6 | 7 | 4 | 5 |
| 3 | 2 | 1 | 0 | 7 | 6 | 5 | 4 |
| 4 | 5 | 6 | 7 | 0 | 1 | 2 | 3 |
| 5 | 4 | 7 | 6 | 1 | 0 | 3 | 2 |
| 6 | 7 | 4 | 5 | 2 | 3 | 0 | 1 |
| 7 | 6 | 5 | 4 | 3 | 2 | 1 | 0 |

Figure 2

|   |   |   |   |
|---|---|---|---|
| a | b | c | d |
| b | a | d | c |
| c | d | a | b |
| d | c | b | a | node: 1, 2, 3, 4, 5

|   |   |   |   |
|---|---|---|---|
| a | b | c | d |
| b | a | d | c |
| c | d | a | b |
| d | c | b | a |
| a | b | c | d |

Figure 3A node: 1, 2, 3, 4, 5

|   |   |   |   |
|---|---|---|---|
| A | b | c | d |
| A | a | d | c |
| A | d | a | b |
| A | c | b | a |
| a | b | c | d | node: 1, 2, 3, 4, 5, 6, 7, 8

|   |   |   |   |
|---|---|---|---|
| A | B | C | D |
| A | B | C | D |
| A | B | C | D |
| A | B | C | D |
| a | b | c | d |
| a | b | c | d |
| a | b | c | d |
| a | b | c | d |

Figure 3B

|   |   |   |   |
|---|---|---|---|
| 0 | 1 | 2 | 3 |
| 1 | 0 | 3 | 2 |
| 2 | 3 | 0 | 1 |
| 3 | 2 | 1 | 0 | node
| | A | B | C | D |
|---|---|---|---|---|
| 1 | A | B | C | D |
| 2 | A | B | C | D |
| 3 | A | B | C | D |
| 4 | A | B | C | D |
| 5 | A | B | C | D |

Figure 4A node
| | | | | |
|---|---|---|---|---|
| 1 | $a$ | B | C | D |
| 2 | A | $a$ | C | D |
| 3 | A | B | $a$ | D |
| 4 | A | B | C | $a$ |
| 5 | A | B | C | D | node
| | | | | |
|---|---|---|---|---|
| 1 | $a$ | $b$ | $c$ | $d$ |
| 2 | $b$ | $a$ | $d$ | $c$ |
| 3 | $c$ | $d$ | $a$ | $b$ |
| 4 | $d$ | $c$ | $b$ | $a$ |
| 5 | A | B | C | D |
| 6 | A | B | C | D |
| 7 | A | B | C | D |
| 8 | A | B | C | D |

Figure 4B

| node | | | | | | | | |
|---|---|---|---|---|---|---|---|---|
| 1 | a | b | c | d | e | f | g | h |
| 2 | b | a | d | c | f | e | h | g |
| 3 | c | d | a | b | g | h | e | f |
| 4 | d | c | b | a | h | g | f | e |

| node | | | | | | | | |
|---|---|---|---|---|---|---|---|---|
| 1 | A | b | c | d | E | f | g | h |
| 2 | A | a | d | c | E | e | h | g |
| 3 | A | d | a | b | E | h | e | f |
| 4 | A | c | b | a | E | g | f | e |
| 5 | a | b | c | d | e | f | g | h |

Figure 5A

| node | | | | | | | | |
|---|---|---|---|---|---|---|---|---|
| 1 | A | B | c | d | E | F | g | h |
| 2 | A | B | d | c | E | F | h | g |
| 3 | A | B | a | b | E | F | e | f |
| 4 | A | B | b | a | E | F | f | e |
| 5 | a | b | c | d | e | f | g | h |
| 6 | a | b | c | d | e | f | g | h |

| node | | | | | | | | |
|---|---|---|---|---|---|---|---|---|
| 1 | A | B | C | D | E | F | G | H |
| 2 | A | B | C | D | E | F | G | H |
| 3 | A | B | C | D | E | F | G | H |
| 4 | A | B | C | D | E | F | G | H |
| 5 | a | b | c | d | e | f | g | h |
| 6 | a | b | c | d | e | f | g | h |
| 7 | a | b | c | d | e | f | g | h |
| 8 | a | b | c | d | e | f | g | h |

Figure 5B

|   |   |   |   |   |   |   |   | node |   |   |   |   |   |   |   |   |
|---|---|---|---|---|---|---|---|------|---|---|---|---|---|---|---|---|
| 0 | 1 | 2 | 3 | 4 | 5 | 6 | 7 | 1 | A | B | C | D | E | F | G | H |
| 1 | 0 | 3 | 2 | 5 | 4 | 7 | 6 | 2 | A | B | C | D | E | F | G | H |
| 2 | 3 | 0 | 1 | 6 | 7 | 4 | 5 | 3 | A | B | C | D | E | F | G | H |
| 3 | 2 | 1 | 0 | 7 | 6 | 5 | 4 | 4 | A | B | C | D | E | F | G | H |
| 4 | 5 | 6 | 7 | 0 | 1 | 2 | 3 | 5 | a | b | c | d | e | f | g | h |
| 5 | 4 | 7 | 6 | 1 | 0 | 3 | 2 | 6 | a | b | c | d | e | f | g | h |
| 6 | 7 | 4 | 5 | 2 | 3 | 0 | 1 | 7 | a | b | c | d | e | f | g | h |
| 7 | 6 | 5 | 4 | 3 | 2 | 1 | 0 | 8 | a | b | c | d | e | f | g | h |
|   |   |   |   |   |   |   |   | 9 | A | B | C | D | e | f | g | h |

Figure 6A

| | | | | | | | | node | | | | | | | | |
|---|---|---|---|---|---|---|---|---|---|---|---|---|---|---|---|---|
| $a$ | B | C | D | E | F | G | H | 1 | $a$ | $b$ | C | D | E | F | G | H |
| A | $a$ | C | D | E | F | G | H | 2 | $b$ | $a$ | C | D | E | F | G | H |
| A | B | $a$ | D | E | F | G | H | 3 | A | B | $a$ | $b$ | E | F | G | H |
| A | B | C | $a$ | E | F | G | H | 4 | A | B | $b$ | $a$ | E | F | G | H |
| a | b | c | d | $a$ | f | g | h | 5 | a | b | c | d | $a$ | $b$ | g | h |
| a | b | c | d | e | $a$ | g | h | 6 | a | b | c | d | $b$ | $a$ | g | h |
| a | b | c | d | e | f | $a$ | h | 7 | a | b | c | d | e | f | $a$ | $b$ |
| a | b | c | d | e | a | b | $a$ | d | a | b | c | d | e | f | $b$ | $a$ |
| A | B | C | D | e | f | g | h | 9 | A | B | C | D | e | f | g | h |
| | | | | | | | | 10 | A | B | C | D | e | f | g | h |

Figure 6B

| node | | | | | | | | | node | | | | | | | | |
|---|---|---|---|---|---|---|---|---|---|---|---|---|---|---|---|---|---|
| 1 | a | b | c | d | e | f | g | h | 9 | A | B | C | D | e | f | g | h |
| 2 | b | a | d | c | f | e | h | g | 10 | A | B | C | D | e | f | g | h |
| 3 | c | d | a | b | g | h | e | f | 11 | A | B | C | D | e | f | g | h |
| 4 | d | c | b | a | h | g | f | e | 12 | A | B | C | D | e | f | g | h |
| 5 | e | f | g | h | a | b | c | d | 13 | a | b | c | d | E | F | G | H |
| 6 | f | e | h | g | b | a | d | c | 14 | a | b | c | d | E | F | G | H |
| 7 | g | h | e | f | c | d | a | b | 15 | a | b | c | d | E | F | G | H |
| 8 | h | g | f | e | d | c | b | a | 16 | a | b | c | d | E | F | G | H |

Figure 7A

| node | | | | | | | | | node | | | | | | | | |
|---|---|---|---|---|---|---|---|---|---|---|---|---|---|---|---|---|---|
| 1 | a | b | c | d | e | f | g | h | 1 | i | b | c | d | e | f | g | h |
| 2 | b | a | d | c | f | e | h | g | 2 | i | a | d | c | f | e | h | g |
| 3 | c | d | a | b | g | h | e | f | 3 | i | d | a | b | g | h | e | f |
| 4 | d | c | b | a | h | g | f | e | 4 | i | c | b | a | h | g | f | e |
| 5 | e | f | g | h | a | b | c | d | 5 | i | f | g | h | a | b | c | d |
| 6 | f | e | h | g | b | a | d | c | 6 | i | e | h | g | b | a | d | c |
| 7 | g | h | e | f | c | d | a | b | 7 | i | h | e | f | c | d | a | b |
| 8 | h | g | f | e | d | c | b | a | 8 | i | g | f | e | d | c | b | a |
| | | | | | | | | | 17 | a | b | c | d | e | f | g | h |

Figure 7B

| node | | | | | | | | | node | | | | | | | | |
|---|---|---|---|---|---|---|---|---|---|---|---|---|---|---|---|---|---|
| 1 | i | j | k | l | m | n | o | p | 17 | a | b | c | d | e | f | g | h |
| 2 | i | j | k | l | m | n | o | p | 18 | a | b | c | d | e | f | g | h |
| 3 | i | j | k | l | m | n | o | p | 19 | a | b | c | d | e | f | g | h |
| 4 | i | j | k | l | m | n | o | p | 20 | a | b | c | d | e | f | g | h |
| 5 | i | j | k | l | m | n | o | p | 21 | a | b | c | d | e | f | g | h |
| 6 | i | j | k | l | m | n | o | p | 22 | a | b | c | d | e | f | g | h |
| 7 | i | j | k | l | m | n | o | p | 23 | a | b | c | d | e | f | g | h |
| 8 | i | j | k | l | m | n | o | p | 24 | a | b | c | d | e | f | g | h |

ADAPTIVE RAID WIDTH AND DISTRIBUTION FOR FLEXIBLE STORAGE

TECHNICAL FIELD

The subject matter of this disclosure is generally related to data storage systems.

BACKGROUND

Scalable data storage systems for organizations are designed to have low initial cost and be reconfigurable to grow to meet future needs. For example, homogeneous software-defined, server-based storage area network (SAN) storage nodes can be used as modular storage system building blocks. Storage system resiliency is based on redundant array of independent disks (RAID) protection groups having members distributed across different storage nodes. However, the width of the implemented RAID level can limit the granularity at which storage capacity can be scaled. Moreover, reconfiguring the storage system to a different RAID level may be difficult, which is problematic because modular storage systems may initially only be capable of being configured with a smaller RAID width but eventually include enough storage nodes to be configured for a more efficient larger RAID width.

SUMMARY

The examples described herein are not intended to be limiting. All examples, aspects, and features mentioned in this document can be combined in any technically possible way.

In accordance with some aspects, an apparatus comprises a plurality of homogeneous storage nodes that are interconnected via a network, each storage node comprising a server and local storage, each server comprising a multi-core processor, memory, and a storage controller configured to: subdivide storage capacity of the local storage into indexed same-size cells; create and distribute members of protection groups across the storage nodes in the cells in a recursive fractal distribution pattern; and metamorphose distribution of sets of the members of the protection groups from the recursive fractal distribution pattern to a linear distribution pattern in response to addition of new storage nodes, thereby enabling scaling in increments of single storage nodes.

In accordance with some aspects, a method comprises subdividing storage capacity of local storage of a plurality of homogeneous storage nodes that are interconnected via a network into indexed same-size cells; creating and distributing members of protection groups across the storage nodes in the cells in a recursive fractal distribution pattern; and metamorphosing distribution of sets of the members of the protection groups from the recursive fractal distribution pattern to a linear distribution pattern in response to addition of new storage nodes, thereby enabling scaling in increments of single storage nodes.

In accordance with some aspects, a non-transitory computer-readable storage medium stores instructions that when executed by a computer cause the computer to perform a method comprising subdividing storage capacity of local storage of a plurality of homogeneous storage nodes that are interconnected via a network into indexed same-size cells; creating and distributing members of protection groups across the storage nodes in the cells in a recursive fractal distribution pattern; and metamorphosing distribution of sets of the members of the protection groups from the recursive fractal distribution pattern to a linear distribution pattern in response to addition of new storage nodes, thereby enabling scaling in increments of single storage nodes.

BRIEF DESCRIPTION OF THE FIGURES

FIGS. 5A, 5B, 6A, 6B, 7A, 7B, and 8 illustrate RAID width adaptation.

DETAILED DESCRIPTION

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation abstractions of tangible features. The term "physical" is used to refer to tangible features. For example, multiple virtual computing devices could operate simultaneously on one physical computing device. The term "logic" is used to refer to special purpose physical circuit elements and software instructions that are stored on a non-transitory computer-readable medium and implemented by multi-purpose tangible processors. The terms "disk" and "drive" are used interchangeably and are not intended to be limited to a particular type of non-volatile data storage media.

Figure 1:
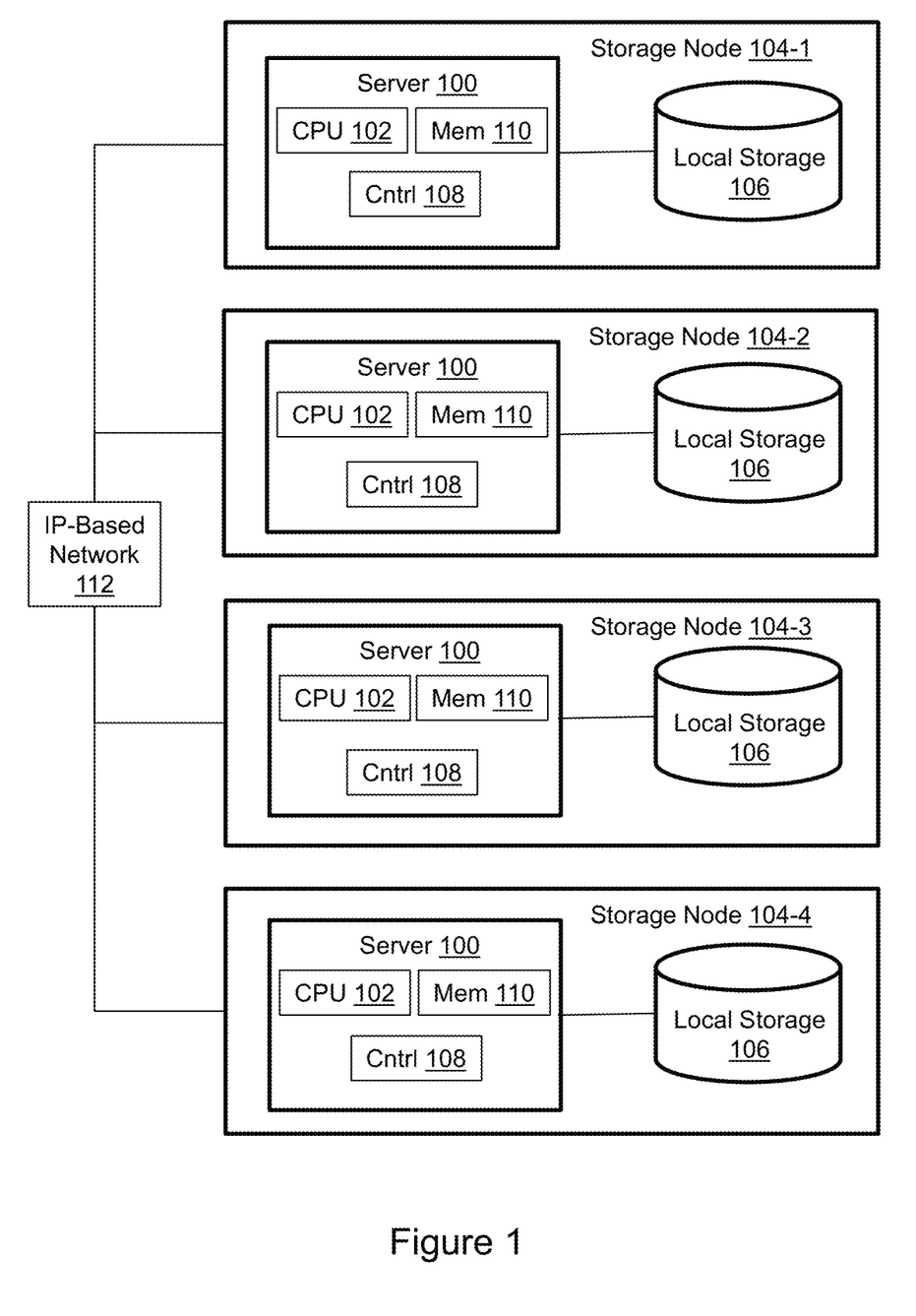
FIG. 1 illustrates a software-defined, server-based storage area network (SAN) with single node granular scaling and adaptive RAID width capabilities.

FIG. 1 illustrates a software-defined, server-based storage area network (SAN) with single node granular scaling and adaptive RAID width capabilities. The software-defined SAN includes multiple homogeneous storage nodes 104-1, 104-2, 104-3, 104-4 that are interconnected via an Internet Protocol (IP) network 112. Each storage node includes a server 100 and local storage 106. Each server 100 includes a multi-core CPU 102, a storage controller 108, and a memory bank 110. The CPU 102 includes L1 onboard cache. Each memory bank 110 includes L2/L3 cache and main memory implemented with one or both of volatile memory components such as Double Data Rate Synchronous Dynamic Random Access Memory (DDR SDRAM), and non-volatile memory (NVM) such as storage class memory (SCM). The local storage 106 includes one or more non-volatile disk drives. For example, the local storage may include solid-state drives (SSDs) based on electrically erasable programmable read-only memory (EEPROM) technology such as NAND and NOR flash memory and hard disk drives (HDDs) with spinning disk magnetic storage media. Each local storage has the same type and quantity of local storage devices with matching storage capacity, so each storage node has the same storage capacity.

The storage controllers 108 manage organization of the directly-attached local storage 106. The local storage is subdivided into equal size units of storage capacity referred to as cells. The cells are indexed, e.g., 1, 2, 3, . . . , and the cell indices are used uniformly for all storage nodes. Aggregate storage capacity of the SAN is organized into RAID protection groups with members located in cells that are distributed across different storage nodes. The number of cells may be an integer multiple of the target RAID width. Storage system efficiency and data availability are determined by the number of data and parity members per RAID protection group, which is referred to as RAID width. A large RAID width corresponds to lower parity overhead cost and greater storage efficiency. However, the storage system may initially be implemented with too few storage nodes for a large RAID width because storage nodes in a modular storage system are purchased and scaled based on evolving organizational needs. As will be explained in greater detail below, the aggregate storage capacity of the disclosed storage system can advantageously be scaled in increments of single storage nodes regardless of the implemented RAID level and the RAID width and distribution can be automatically adapted to the number of storage nodes in the storage system such that new RAID groups with larger RAID widths are formed to improve storage efficiency or data availability when scaling provides a sufficient number of storage nodes in the storage system.

Figure 2:
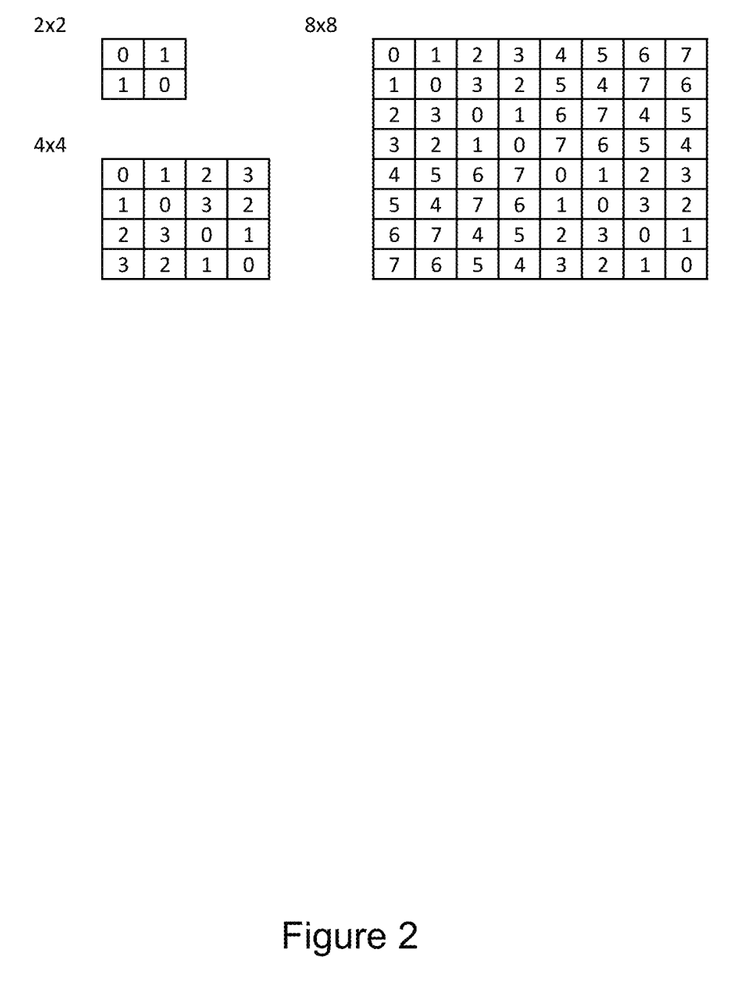
FIG. 2 illustrates matrices that represent organization of aggregate storage in RAID groups characterized by recursive fractal patterns.

As shown in FIG. 2, recursive fractal storage configurations supporting RAID widths 2, 4, and 8 for RAID-1 (1+1), RAID-5 (3+1), and RAID-6 (6+2), for example, may be viewed as 2×2, 4×4, and 8×8 matrices, respectively, where each row corresponds to a storage node and each column corresponds to a cell index. The reference number within each position of a matrix represents the RAID group of the member that occupies that position. Every RAID group comprises members distributed across different rows because the members are distributed across different storage nodes to protect against storage node failure. For example, RAID-6 (6+2) group 0 has members on a diagonal of the 8×8 matrix. RAID protection group distribution in the illustrated matrices, and thus aggregate storage, is characterized by recursive fractal patterns. For example, the 4×4 matrix is a 2×2 matrix of 4-cell patterns, where each pattern is a 2×2 submatrix. Similarly, the 8×8 matrix is patterned as four 4×4 and/or eight 2×2 submatrices. Larger (by powers of 2) matrices can be recursively patterned accordingly. As will be explained below, recursive fractal distribution of protection group members enables granular scaling and RAID width adaptation. For example, a storage system could initially be configured according to the 2×2 matrix and evolve into the distribution of the 4×4 matrix and then the 8×8 matrix.

Figure 3A:
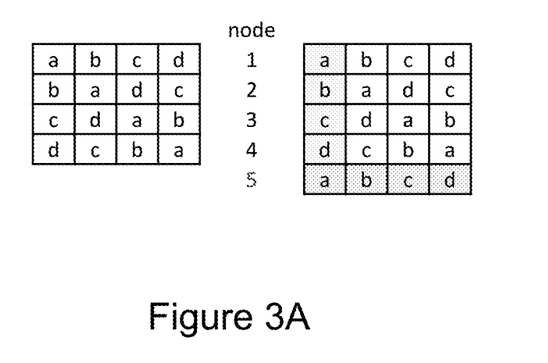
FIGS. 3A and 3B illustrate scaling by metamorphosing from recursive fractal distribution to linear distribution.
Figure 3B:
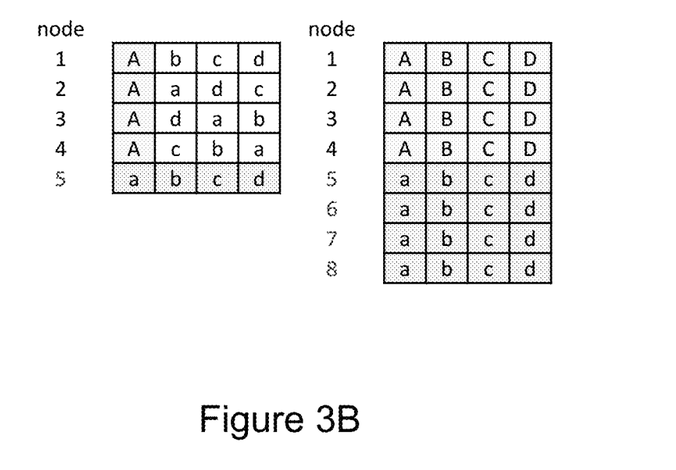

FIGS. 3A and 3B illustrate scaling by metamorphosing from recursive fractal distribution to linear distribution in the context of RAID-5 (3+1) groups (a, b, c, d) starting with a 4×4 matrix. When a new storage node 5 is added to the 4-node storage system, members of RAID groups (a, b, c, d) from four same-index cells in the first column are groupwise-rotationally relocated from the original 4×4 matrix into the cells of the new row corresponding to storage node 5. The relocation frees space for creation of a new RAID-5 (3+1) group (A) that is linearly distributed in the vacated same-index cells. As additional storage nodes are added, members from sequentially adjacent same-index cell columns of the original 4-node storage system with recursive fractal distributed groups (a, b, c, d) are groupwise-rotationally relocated into the new rows corresponding to the new storage nodes to free space for new RAID-5 (3+1) groups (B, C, D) that are linearly distributed in the vacated same-index cells. After adding four new storage nodes (5-8), all the protection groups are linearly distributed, and storage capacity can be split into two 4-node linearly distributed subsets: nodes 1-4 and nodes 5-8.

Figure 4A:
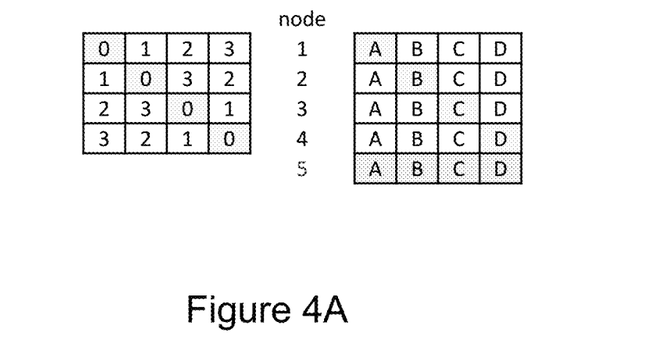
FIGS. 4A and 4B illustrate scaling by metamorphosing from linear distribution to recursive fractal distribution.
Figure 4B:
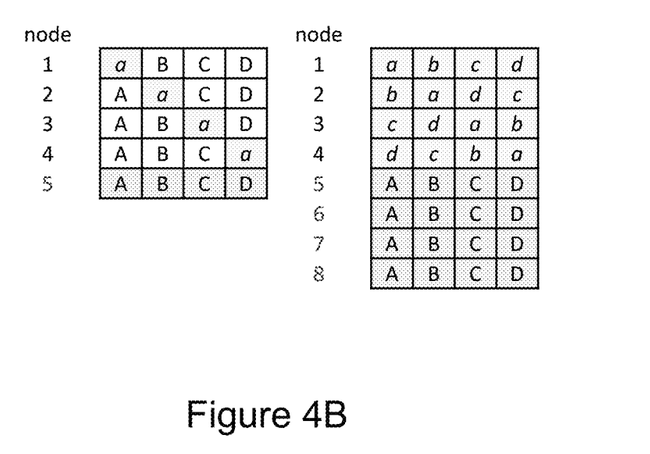

FIGS. 4A and 4B illustrate scaling by metamorphosing from linear distribution to recursive fractal distribution. The 4×4 recursive fractal matrix described above is superimposed on one of the 4×4 linearly distributed subsets (nodes 1-4) that was split-off as described above. New RAID groups are distributed according to the distribution pattern of the matching size recursive fractal matrix. For example, when a new row 5 is added, the RAID group members on the diagonal cells superimposed with number 0 are relocated to the new row. A new RAID group (a) is created using the vacated cells. The procedure is iterated with numbers 1, 2, and 3, in sequence. After adding three more rows (6-8) in this manner, three more new RAID groups (b, c, d) have been created using cells superimposed with numbers 1, 2, and 3, respectively. Members of each original RAID group are relocated to cells of the new storage nodes at the same-column indices. The linear distribution pattern thus metamorphoses into two subsets: a first subset characterized by a recursive fractal pattern and a second subset characterized by a column-wise linear pattern.

FIGS. 5A, 5B, 6A, 6B, 7A, 7B, and 8 illustrate RAID width adaptation. The addition of storage nodes enables implementation of larger RAID widths. RAID distribution can be automatically metamorphosed such that new RAID groups are formed with larger RAID width. For example, a system of RAID-5 (3+1) may evolve into RAID-6 (6+2) as the storage system grows from 4 nodes to more than 8 nodes. The metamorphosis methods adapt to "power of 2" RAID widths with alternating patterns of recursive fractal distribution and linear distribution.

Referring to FIG. 5A, if the storage system is initially configured with 4 storage nodes with 8 cells per node, RAID groups characterized by width 4 can be distributed by repeating the 4×4 recursive fractal matrix pattern in adjacent 4-cell groups. Each 4-cell group is separately metamorphosed as described above. New RAID groups (A, E) are formed with column-wise linear distribution as the system grows with the addition of storage node 5. All RAID groups will be linearly aligned (per column) as the system grows to 8 storage nodes by metamorphosing from recursive fractal to linear distribution as shown in FIG. 5B.

Figure 6A:
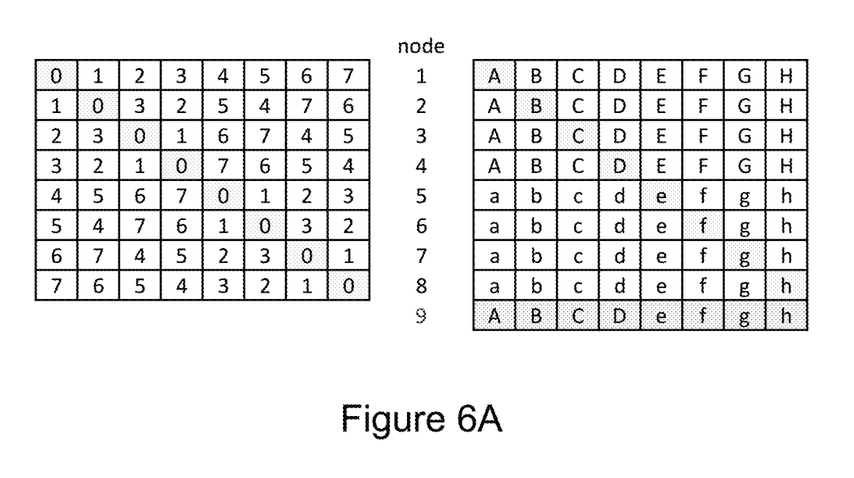
Figure 6B:
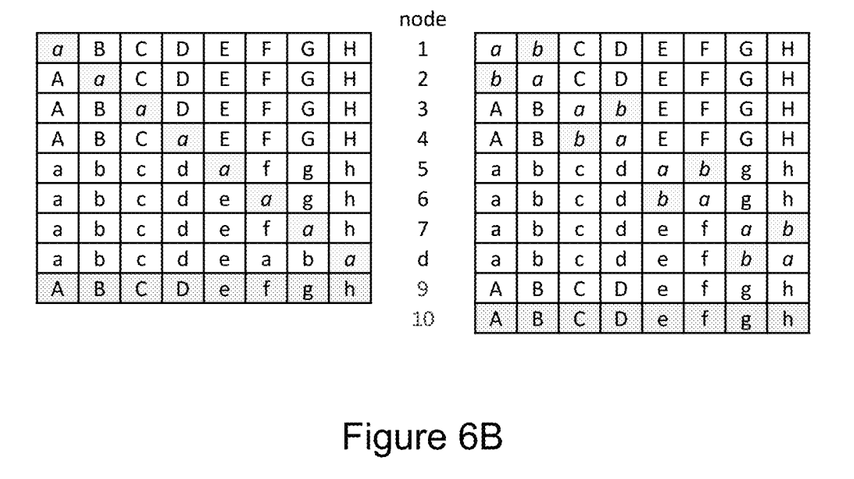

Referring to FIGS. 6A and 6B, as the storage system grows beyond 8 storage nodes, new RAID groups are formed by metamorphosing from linear distribution according to the superimposed 8×8 recursive fractal matrix. After relocating RAID group members from the diagonal cells (marked 0) to the new node 9, the vacated cells are allocated to a new RAID group (a). As more storage nodes are added to the system, original RAID group members from cells marked in subsequent sequential numbers of the 8×8 recursive fractal matrix are relocated to the new storage nodes. The vacated cells are allocated to new RAID groups (b, c, d, e, f, g, h).

Figure 7A:
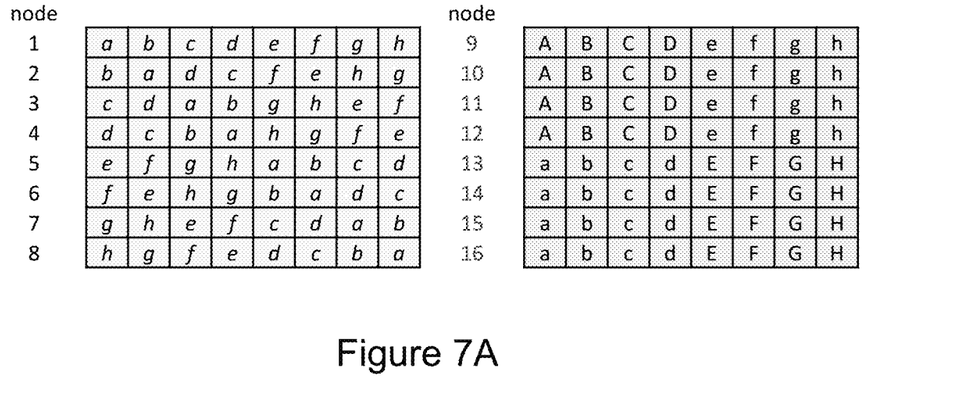
Figure 7B:
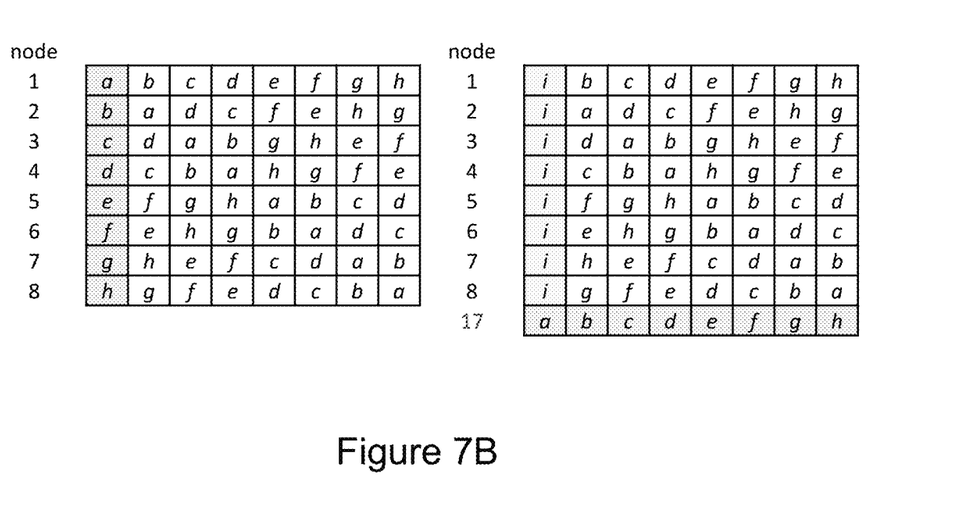

Referring to FIG. 7A, the storage system is split into two subsets after the addition of eight new storage nodes. The first subset of nodes 9-16 has RAID width 4 groups in a linear distribution pattern. There are two RAID width 4 groups per column. Referring to FIG. 7B, same-cell-index pairs of smaller RAID width 4 groups are combined into single larger RAID width 8 groups. Parity is recomputed, e.g., from RAID-5 (3+1) to RAID-6 (6+2). The subset of storage nodes 1-8 includes RAID width 8 groups in a recursive fractal distribution pattern. This subset will support subsequent metamorphosis growth and split cycles. For example, RAID members in the first column will be relocated to a new storage node 17, making room for a new RAID group (i) to be formed. RAID members in subsequent columns may be relocated to successive new storage nodes for new RAID groups to be formed.

Figure 8:
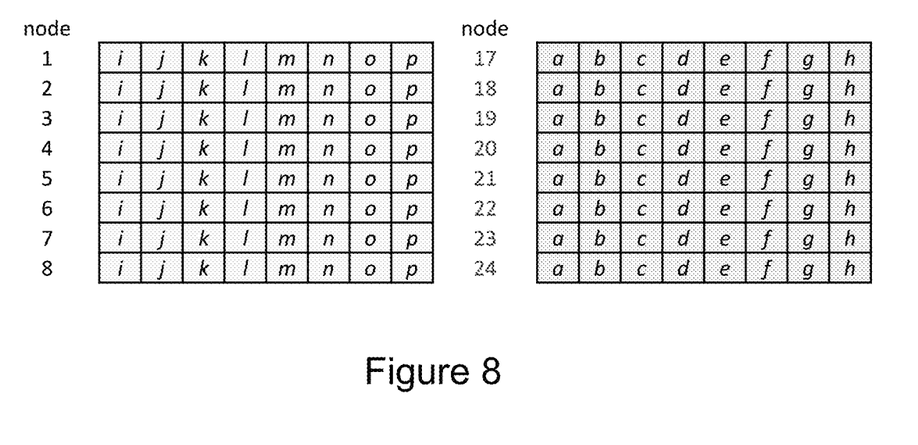

Referring to FIG. 8, after adding eight new storage nodes, the original subset will again metamorphose and split into two subsets, with a linear distribution of all RAID groups. The system may continue to grow in metamorphosis cycles, with alternating patterns of recursive fractal and linear distribution.

If the storage space of each storage node is subdivided into more cells, the system may support larger (power of 2) RAID widths, using the recursive fractals and metamorphosis as described above. However, the storage efficiency is subject to diminishing returns because storage efficiency will be 75% with RAID 5 (3+1) or RAID 6 (6+2), 87.5% with RAID 5 (7+1) or RAID 6 (14+2), and 93.75% with RAID 5 (15+1) or RAID 6 (30+2), etc. A larger RAID width may also increase the complexity of RAID recovery in case of a storage node failure. Therefore, a target maximum RAID width may be selected so that automated RAID width adaptation does not increase RAID width indefinitely.

Figure 9:
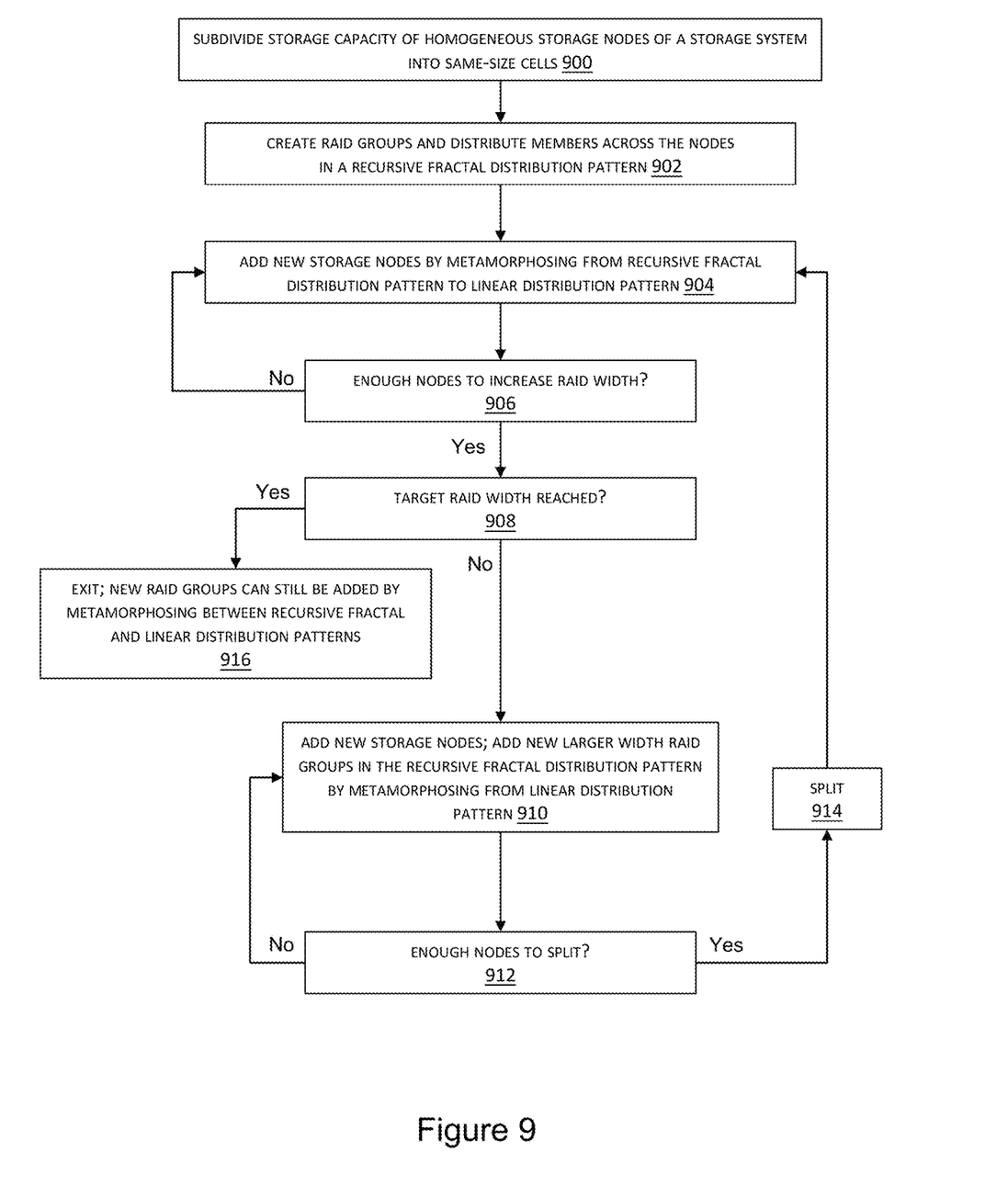
FIG. 9 illustrates a method for granular scaling and RAID width adaptation.

FIG. 9 illustrates a method for granular scaling and RAID width adaptation. Step 900 is subdividing the storage capacity of a group of homogeneous storage nodes into indexed same-size cells. The storage nodes may be parts of a software-defined, server-based SAN, but that should not be viewed as a limitation because other types of storage systems and nodes could be used. Step 902 is creating and distributing RAID groups across the nodes in a recursive fractal distribution pattern. The RAID level may be selected based on the number of storage nodes, e.g., with the RAID width being selected as a function of the number of storage nodes. No more than one member of any RAID group is located on the same storage node. Step 904 is adding new storage nodes by metamorphosing from the recursive fractal distribution pattern to a linear distribution pattern. The nodes may be added individually. For example, same-cell-index members may be groupwise-rotated to cells on a new storage node, iteratively for each new storage node with sequentially indexed cells until there are enough nodes to increase the RAID width. After there are enough nodes to increase the RAID width as determined in step 906, step 908 determines whether the target RAID width has been reached. If the target RAID width has not been reached, then step 910 is adding new storage nodes and adding new larger width RAID groups in the recursive fractal distribution pattern by metamorphosing from the linear distribution pattern. The step may be performed automatically, and the new RAID level may be selected based on the number of storage nodes in the system. Parity is recomputed. This is iterated until there are enough nodes for a split as determined in step 912. When there are enough storage nodes for a split, a split is implemented in step 914 and the flow returns to step 904. The matrix of cells into two subsets: a first subset that is distributed in a linear pattern and a second subset that is distributed in a recursive fractal pattern. If the target RAID width has been reached as determined in step 908, then flow exits from the existing loops of steps and new RAID groups can still be added by metamorphosing between recursive fractal and linear distribution patterns in step 916.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a plurality of homogeneous storage nodes that are interconnected via a network, each storage node comprising a server and local storage, each server comprising a multi-core processor, memory, and a storage controller configured to:
subdivide storage capacity of the local storage into indexed same-size cells;
create and distribute members of protection groups across the storage nodes in the cells in a recursive fractal distribution pattern; and
metamorphose distribution of sets of the members of the protection groups from the recursive fractal distribution pattern to a linear distribution pattern in response to addition of new storage nodes, thereby enabling scaling in increments of single storage nodes.

2. The apparatus of claim 1 further comprising the storage controller being configured to metamorphose distribution of the protection groups from the recursive fractal distribution pattern to the linear distribution pattern until all protection groups are linearly distributed.

3. The apparatus of claim 2 further comprising the storage controller being configured to metamorphose distribution of the protection groups from the recursive fractal distribution pattern to the linear distribution pattern via group-wise rotation of same-cell-index protection group members to cells on a new storage node, iteratively for each new storage node with sequentially indexed cells.

4. The apparatus of claim 3 further comprising the storage controller being configured to split the protection groups into two subsets and metamorphose distribution of the protection groups of one of the subsets from the linear distribution pattern to the recursive fractal distribution pattern in response to addition of new storage nodes.

5. The apparatus of claim 4 further comprising the storage controller being configured to metamorphose distribution of the protection groups of one of the subsets from the linear distribution pattern to the recursive fractal distribution pattern by selecting protection group members corresponding to superimposition of a recursive fractal matrix on the linear distribution pattern.

6. The apparatus of claim 5 further comprising the storage controller being configured to split the protection groups into two subsets: a first subset that is distributed in a linear pattern and a second subset that is distributed in a recursive fractal pattern.

7. The apparatus of claim 6 further comprising the storage controller being configured to combine pairs of protection groups with the same cell index into single wider protection groups responsive to addition of a sufficient number of storage nodes.

8. A method comprising:
  subdividing storage capacity of local storage of a plurality of homogeneous storage nodes that are interconnected via a network into indexed same-size cells;
  creating and distributing members of protection groups across the storage nodes in the cells in a recursive fractal distribution pattern; and
  metamorphosing distribution of sets of the members of the protection groups from the recursive fractal distribution pattern to a linear distribution pattern in response to addition of new storage nodes, thereby enabling scaling in increments of single storage nodes.

9. The method of claim 8 further comprising metamorphosing distribution of the protection groups from the recursive fractal distribution pattern to the linear distribution pattern until all protection groups are linearly distributed.

10. The method of claim 9 further comprising metamorphosing distribution of the protection groups from the recursive fractal distribution pattern to the linear distribution pattern by group-wise rotating same-cell-index protection group members to cells on a new storage node, iteratively for each new storage node with sequentially indexed cells.

11. The method of claim 10 further comprising splitting the protection groups into two subsets and metamorphosing distribution of the protection groups of one of the subsets from the linear distribution pattern to the recursive fractal distribution pattern in response to addition of new storage nodes.

12. The method of claim 11 further comprising metamorphosing distribution of the protection groups of one of the subsets from the linear distribution pattern to the recursive fractal distribution pattern by selecting protection group members corresponding to superimposition of a recursive fractal matrix on the linear distribution pattern.

13. The method of claim 12 further comprising splitting the protection groups into two subsets: a first subset that is distributed in a linear pattern and a second subset that is distributed in a recursive fractal pattern.

14. The method of claim 13 further comprising combining pairs of protection groups with the same cell index into single wider protection groups responsive to addition of a sufficient number of storage nodes.

15. A non-transitory computer-readable storage medium storing instructions that are executed by a computer to perform a method comprising:
  subdividing storage capacity of local storage of a plurality of homogeneous storage nodes that are interconnected via a network into indexed same-size cells;
  creating and distributing members of protection groups across the storage nodes in the cells in a recursive fractal distribution pattern; and
  metamorphosing distribution of sets of the members of the protection groups from the recursive fractal distribution pattern to a linear distribution pattern in response to addition of new storage nodes, thereby enabling scaling in increments of single storage nodes.

16. The non-transitory computer-readable storage medium of claim 15 in which the method further comprises metamorphosing distribution of the protection groups from the recursive fractal distribution pattern to the linear distribution pattern until all protection groups are linearly distributed.

17. The non-transitory computer-readable storage medium of claim 16 in which the method further comprises metamorphosing distribution of the protection groups from the recursive fractal distribution pattern to the linear distribution pattern by group-wise rotating same-cell-index protection group members to cells on a new storage node, iteratively for each new storage node with sequentially indexed cells.

18. The non-transitory computer-readable storage medium of claim 17 in which the method further comprises splitting the protection groups into two subsets and metamorphosing distribution of the protection groups of one of the subsets from the linear distribution pattern to the recursive fractal distribution pattern in response to addition of new storage nodes.

19. The non-transitory computer-readable storage medium of claim 18 in which the method further comprises metamorphosing distribution of the protection groups of one of the subsets from the linear distribution pattern to the recursive fractal distribution pattern by selecting protection group members corresponding to superimposition of a recursive fractal matrix on the linear distribution pattern.

20. The non-transitory computer-readable storage medium of claim 19 in which the method further comprises splitting the protection groups into a first subset that is distributed in a linear pattern and a second subset that is distributed in a recursive fractal pattern and combining pairs of protection groups with the same cell index into single wider protection groups responsive to addition of a sufficient number of storage nodes.

\* \* \* \* \*